United States Patent [19]

Oshima et al.

[11] Patent Number: 5,272,871
[45] Date of Patent: Dec. 28, 1993

[54] METHOD AND APPARATUS FOR REDUCING NITROGEN OXIDES FROM INTERNAL COMBUSTION ENGINE

[75] Inventors: Yujiro Oshima; Katsushi Abe; Kazuo Kawahara; Koji Yokota; Hideaki Muraki; Masayuki Fukui, all of Aichi, Japan

[73] Assignee: Kabushiki Kaisha Toyota Chuo Kenkyusho, Aichi, Japan

[21] Appl. No.: 887,133

[22] Filed: May 22, 1992

[30] Foreign Application Priority Data

May 24, 1991 [JP] Japan .................................. 3-149875
Jul. 12, 1991 [JP] Japan .................................. 3-198567

[51] Int. Cl.$^5$ .................................................. F01N 3/20
[52] U.S. Cl. ........................................ 60/274; 60/275; 60/286; 60/301; 60/303
[58] Field of Search ................. 60/274, 301, 286, 303, 60/309, 275, 299, 297

[56] References Cited

U.S. PATENT DOCUMENTS

| | | | |
|---|---|---|---|
| 3,311,097 | 3/1967 | Mittelstaedt | 60/275 |
| 3,779,014 | 12/1973 | Nohira | 60/309 |
| 3,815,337 | 6/1974 | Lenane | 60/299 |
| 3,908,371 | 9/1975 | Nagai | 60/301 |
| 3,986,350 | 10/1976 | Schmidt | 60/301 |
| 4,484,444 | 11/1984 | Bidwell | 60/275 |

FOREIGN PATENT DOCUMENTS 52213  4/1979  Japan .................................. 60/299

Primary Examiner—Douglas Hart
Attorney, Agent, or Firm—Oblon, Spivak, McClelland, Maier & Neustadt

[57] ABSTRACT

Hydrogen gas from a hydrogen generator which creates hydrogen gas by the electrolysis of water or water vapor is supplied at the entrance to a catalyzer provided in an exhaust line. The catalyzer performs a catalytic reaction between hydrogen gas and nitrogen oxides to achieve decomposition into nitrogen gas and water vapor in the exhaust from an internal combustion engine. The nitrogen oxides are directly reduced with said hydrogen gas in a low temperature atmosphere not higher than 350° C. to achieve efficient reduction in the nitrogen oxides. The improved method and apparatus provide a catalytic system with which the nitrogen oxides in the exhaust from a lean burnt engine or a diesel engine can be effectively reduced irrespective of the concentration of oxygen gas in the exhaust without impairing the good fuel economy of those engines.

20 Claims, 12 Drawing Sheets

PELLET-TYPE

MONOLITH TYPE

METHOD AND APPARATUS FOR REDUCING NITROGEN OXIDES FROM INTERNAL COMBUSTION ENGINE

BACKGROUND OF THE INVENTION

This invention relates to a method and apparatus for reducing the content of nitrogen oxides from internal-combustion engines. More specifically, the invention relates to a system for cleaning up lean burnt exhaust that is applicable to a "lean burnt engine" which uses a dilute air-fuel mixture with a view to improving fuel economy, as well as a diesel engine, a hydrogen engine and a Stirling engine (the last-mentioned is an external-combustion engine) and which is capable of effectively reducing and cleaning up nitrogen oxides (hereunder sometimes abbreviated as NOx) in the exhaust irrespective of its concentration of oxygen gas (hereunder sometimes abbreviated as $O_2$) without impairing the good fuel economy of those engines.

Conventionally, three methods have been proposed as means of reducing the content of NOx in the exhaust from internal-combustion engines, principally piston engines and they are:
(1) use of a three-way catalyst;
(2) use of an ultra-lean air/fuel ratio; and
(3) use of a lean NOx catalyst.

These methods have their own disadvantages. The first method requires that the air and fuel mixture to be supplied to the engine should be precisely controlled to the stoichiometric air/fuel ratio (ca. 14.5:1). If the fuel is leaner than the stoichiometric ratio, the content of NOx is not reduced. However, it is known that fuel economy is promoted by operating the engine on the fuel-lean side as shown in FIG. 2. The second method is intended to achieve both lower NOx content and better fuel economy with a "lean burnt engine". However, if one wants to use an air/fuel ratio that is capable of satisfactory reduction in the NOx content, the fuel-air mixture approaches the misfire limit of combustion and this deteriorates not only the fuel economy of the engine but also the drivability of the vehicle. In order to avoid these problems, methods have been proposed by which the air stream in the cylinder is provided with turbulence or increased in flow rate so that the combustion speed is sufficiently increased to bring the misfire limit to a further fuel-lean side. However, this is not expected to achieve a satisfactory effect because if the misfire limit is brought to a further fuel-lean side (see FIG. 3), the NOx emission will decrease by a smaller degree as indicated by the dashed line. To compensate for these problems of the second method, it has been proposed by the third method that the engine be operated at an air/fuel ratio that is near the point where the fuel consumption is at minimum, which point is somewhat closer to the stoichiometric ratio than the misfire limit. The NOx whose content tends to decrease by an insufficient degree in the second method is cleaned up with a zeolite-based lean NOx catalyst in the third method. This approach can potentially provide a system of better fuel economy. However, the lean NOx catalyst which reduces NOx in the presence of a large amount of $O_2$ in the exhaust is required to meet strict temperature and other conditions and this presents one major practical problem to be solved in that it is difficult to achieve satisfactory catalytic of NOx while using the catalyst over an extended period (high catalyst durability). Thus, each of the methods so far proposed for achieving satisfactory reduction in NOx content while using an air/fuel ratio that is capable of achieving maximum improvement in the fuel economy of the engine has many problems to be solved before they are put to practical use.

SUMMARY OF THE INVENTION

The present invention has been accomplished under these circumstances and has as an object providing a method for reducing nitrogen oxides in exhaust gases from an internal combustion engine, which method is capable of suppressing the release of NOx.

Another object of the present invention is to provide an apparatus for reducing nitrogen oxides in exhaust gases from an internal combustion engine, which apparatus is also capable of suppressing the release of NOx.

The method and apparatus of the present invention provide a catalytic exhaust system with which the NOx in the exhaust from a lean burnt engine or a diesel engine which always operates on the oxygen (air)-rich side can be effectively reduced and cleaned up in the presence of both NOx and $O_2$ in the exhaust irrespective of the concentration of $O_2$ in the exhaust without impairing the good fuel economy of either type of engines.

The method of the present invention for reducing nitrogen oxides in exhaust gases from an internal combustion engine, comprises a step of supplying a hydrogen gas from a hydrogen generator for mixing into exhaust gases including nitrogen oxides and oxygen gas at an upstream position of a catalyzer provided in an exhaust line, said hydrogen generator producing said hydrogen gas by electrolysis of water or water vapor and said catalyzer causing a catalytic reaction between the hydrogen gas and nitrogen oxides to decompose into nitrogen gas and water vapor, and a step of directly reducing said nitrogen oxides in said exhaust gases with said hydrogen gas under a low temperature atmosphere of not higher than 350° C.

The apparatus of the present invention for reducing nitrogen oxides in exhaust gases including nitrogen oxides and an oxygen gas from an internal combustion engine, said apparatus comprises: a hydrogen generator for producing the hydrogen gas by the electrolysis of water or water vapor, thereby supplying said hydrogen gas into said exhaust gases at an upstream position of said catalyzer; and a catalyzer for reducing said nitrogen oxides into a nitrogen gas and water vapor by a catalytic reaction between a hydrogen gas and nitrogen oxides, said catalyzer being provided in an exhaust line; whereby said nitrogen oxides are directly reduced with said hydrogen gas from said hydrogen generator under a low temperature atmosphere of not higher than 350° C.

DETAILED DESCRIPTION OF THE INVENTION

Figure 1:
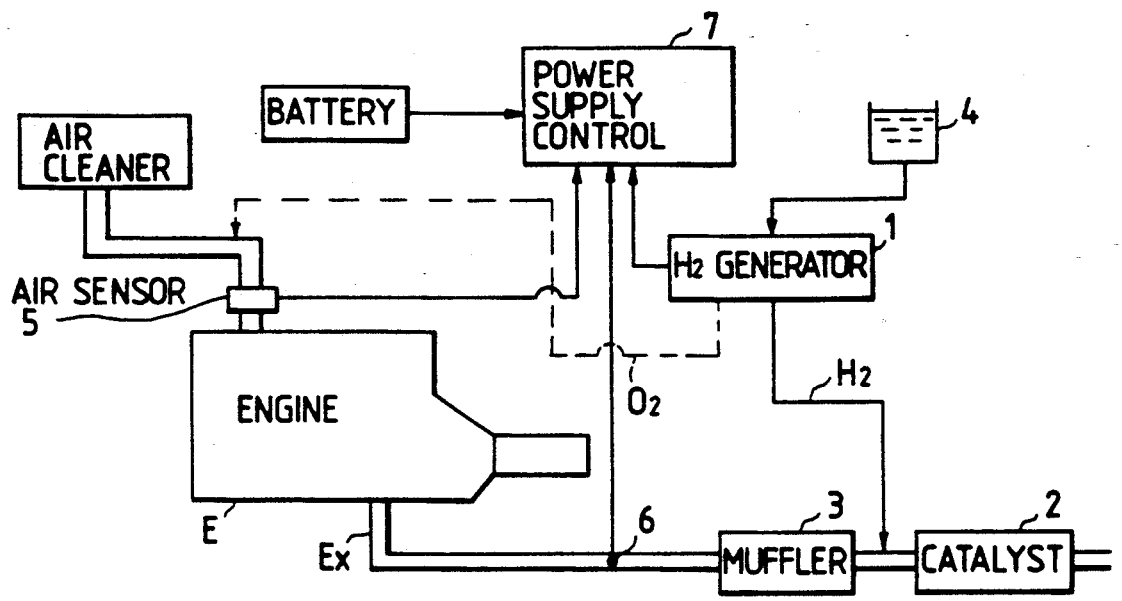
FIG. 1 is a block diagram showing the basic layout of the system of the present invention for reducing nitrogen oxides in an internal combustion engine.
Figure 2:
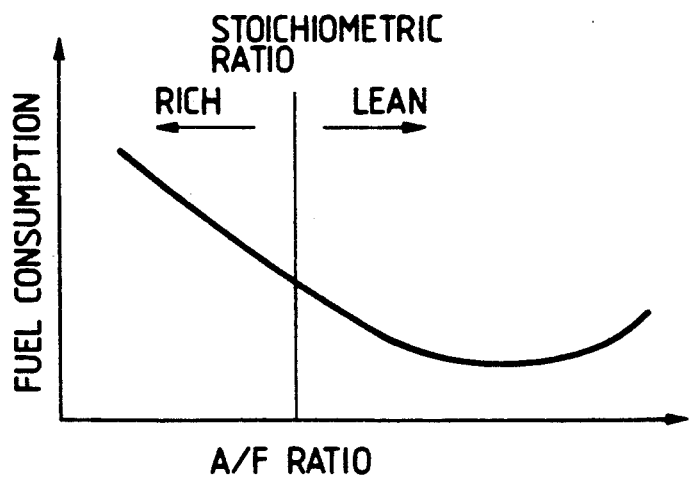
FIG. 2 is a graph showing the relationship between air/fuel ratio and fuel economy.
Figure 3:
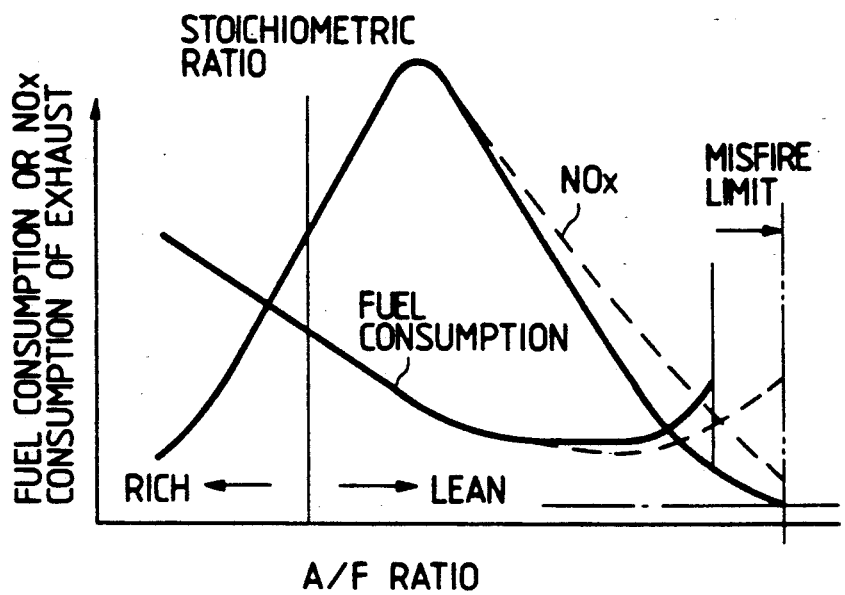
FIG. 3 is a graph showing the relationship between the fuel economy of a lean burnt engine and NOx.

In a preferred embodiment of the present invention, the catalyzer may be packed with a NOx catalyst such as a zeolite-based catalyst. If desired, the electrolytic cell in the hydrogen generator may be supplied with from a water tank or with water vapor that is contained in part of the exhaust or blow-by gases as introduced into the system, so that water electrolysis is effected to generate $H_2$.

In addition to the solid electrolyte having a proton or hydroxyl ion conducting capability, various other electrolytes may be used to effect water electrolysis in the hydrogen generator and they include aqueous solutions of alkalies such as NaOH and KOH, as well as aqueous solutions of acids such as $H_2SO_4$.

Thus, one embodiment of the method of the present invention for reducing nitrogen oxide from an internal combustion engine is characterized in that hydrogen gas from a hydrogen generator is supplied at the entrance to a catalyzer provided in an exhaust line and that the nitrogen oxide in the exhaust emitted by the burning of a fuel feed in the combustion chamber are directly reduced and cleaned up with said hydrogen gas in a cold atmosphere not hotter than 350° C., thereby reducing said nitrogen oxides, said catalyzer performing a catalytic reaction between hydrogen gas and nitrogen oxides in the presence of nitrogen oxides and oxygen gas so as to achieve decomposition into nitrogen gas and water, and said hydrogen generator creating hydrogen gas by water electrolysis using an aqueous alkali or acid solution.

One embodiment of the apparatus of the present invention for reducing nitrogen oxides from an internal combustion engine is characterized by comprising a catalyzer provided in an exhaust line and a hydrogen generator provided to communicate with the entrance to said catalyzer so that it can be supplied with hydrogen gas, said catalyzer performing a catalytic reaction between hydrogen gas and nitrogen oxides so that they are decomposed into nitrogen gas and water in the presence of nitrogen oxides and oxygen gas in the exhaust emitted by the burning of a fuel in the combustion chamber of the internal-combustion engine as it is supplied from a fuel feeder, said hydrogen generator creating hydrogen gas by water electrolysis using an aqueous alkali or acid solution, the nitrogen oxides in said exhaust being directly reduced and cleaned up with the hydrogen gas from said hydrogen generator in a cold atmosphere not hotter than 350° C., thereby reducing said nitrogen oxides.

In another preferred embodiment of the present invention, a NOx sensor and an air intake sensor may be provided on the exhaust pipe in the exhaust line and the flow rate of NOx is computed from the outputs of the two sensors, so that an appropriate $H_2$ level is determined at all times to control the voltage or current to be supplied to the electrolytic cell in the hydrogen generator.

In yet another preferred embodiment, sensors may be provided that are capable of detecting various conditions of operation in the internal-combustion engine such as its rotational speed, the negative pressure on the intake pipe, the opening of the intake control valve and the amount of fuel injection from an injection pump as a fuel feeder and the flow rate of NOx is predictively computed from the outputs of those sensors to control the voltage or current to be supplied to the electrolytic cell in the hydrogen generator (this approach may be referred to as a "learning control" system).

In another preferred embodiment of the present invention, a mixer may be provided or the muffler in the exhaust line may be effectively used in order to achieve uniform mixing of $H_2$ and the exhaust at the entrance to the catalyzer.

The method and apparatus of the present invention for reducing nitrogen oxides from internal combustion engines have been invented to solve the aforementioned problems of the prior art and the basic layout of the system is shown in FIG. 1. The main thrust of the present invention is to perform NOx reduction with $H_2$ on the lower temperature side in such a way that it is included within the full operating range of the engine E. The second characteristic point of the invention is to install the $H_2$ generator 1 in the system in order to enable operation on the lower temperature side. The third point that characterizes the invention is to control the $H_2$ generator 1 in accordance with the operating state of the engine E or NOx in the exhaust so that $H_2$ can always be supplied in an amount corresponding to NOx in the exhaust (this contributes to reduction in the electric power for generating $H_2$).

If a catalyzer 2 is exposed to an excessively high temperature, $H_2$ will react with $O_2$, whereby the selectivity for the reaction between $H_2$ and NOx is lost. Hence, the catalyzer 2 must be located near the muffler 3 in order to avoid exposure to temperatures higher than 350° C. In the system shown in FIG. 1, a water tank 4 is provided and the water it supplies is electrolyzed to generate $H_2$. The generated $H_2$ is supplied at a point near the entrance to the catalyzer 2. By-product $O_2$ is either released into the atmosphere or mixed with air taken into the system. To insure that $H_2$ is supplied in an amount corresponding to the NOx in the exhaust, the system adopts the following method: the air taken in by the engine E is measured with a sensor 5 and the concentration of NOx in the exhaust is measured with a NOx sensor 6; a control power supply 7 is turned on to compute the flow rate of NOx from the outputs of the two sensors 5 and 6; then the current to be supplied to the electrolytic cell in the $H_2$ generator is controlled so that $H_2$ is generated in an amount that corresponds to the flow rate of NOx.

The advantages that are achieved by the method and apparatus of the present invention for reducing nitrogen oxides from internal combustion engines are specifically described below.

Figure 4A:
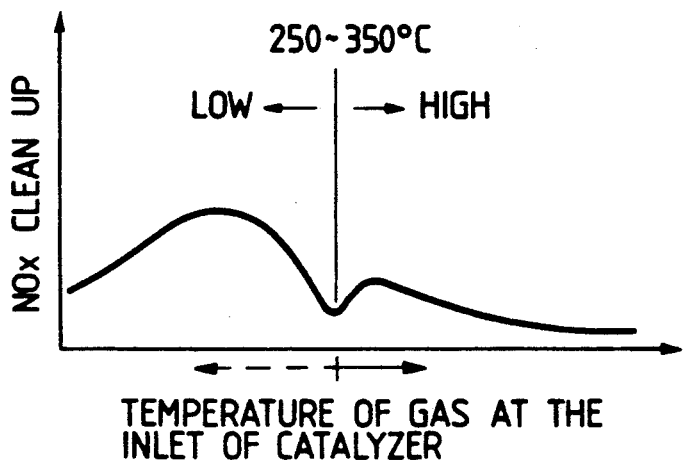
FIG. 4A is a graph showing a characteristic of a lean NOx catalyst.
Figure 4B:
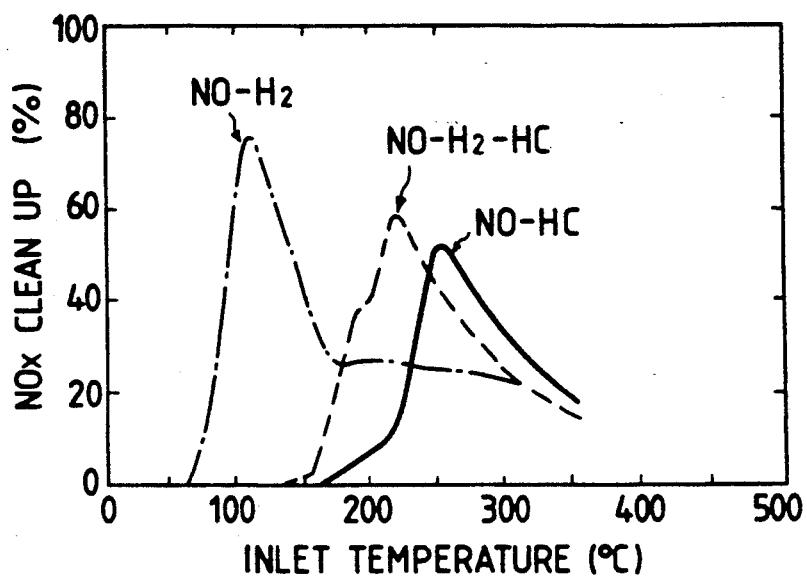
FIG. 4B is a graph showing another characteristic of a lean NOx catalyst.

The lean burnt engine and the diesel engine are basically the same in that the exhaust contains excess $O_2$ and the concentration of $O_2$ in the exhaust increases as the air/fuel ratio increases. The catalyst for reducing and cleaning up the NOx in such $O_2$ containing exhaust is called a "lean catalyst", which is often selected from among noble metal based catalysts such as those supported on zeolite. The relationship between temperature and the NOx cleanup by the lean catalyst is as shown in FIG. 4A. The reaction between HC and NOx occurs mainly in the high-temperature (>350° C.) range. On the other hand, in the low-temperature (<250°-350° C.) range, a reaction for reducing NOx with $H_2$ occurs, enabling the cleanup of NOx. Another type of catalyst for reducing and cleaning up the NOx in the $O_2$ containing exhaust is also called a "lean NOx catalyst", which is selected from among those catalysts which support noble metals such as Pt. The relationship between temperature and the NOx cleanup by the lean NOx catalyst is as shown in FIG. 4B. If CO or active HC is present in gases that flow into the catalyzer, those gases will cover the surface of the catalyst through adsorption, thereby blocking the reaction of NOx reduction with $H_2$.

Conventionally, the catalyzer is installed near the exhaust manifold on the engine, so the catalyst is exposed to the exhaust which is as hot as 800°-900° C. at maximum. In addition, the exhaust from the lean burnt engine which uses an air-fuel mixture leaner than the stoichiometric ratio is substantially free from $H_2$. Under the circumstances, it has been impossible in the prior art to utilize the characteristics of the catalyst that is on the lower temperature side.

In contrast, the method and apparatus of the present invention which are composed in the manner shown in FIG. 1 have the advantage that whether the engine is operated at an air/fuel ratio richer or leaner than the stoichiometric value or at the stoichiometric ratio (i.e., irrespective of the presence or absence of $O_2$ from the exhaust or of the concentration of $O_2$ in the exhaust), NOx can be reduced with the catalyst so that the best performance of the engine (automobile) and fuel can be selected without considering the conditions for reducing the NOx content.

Figure 5:
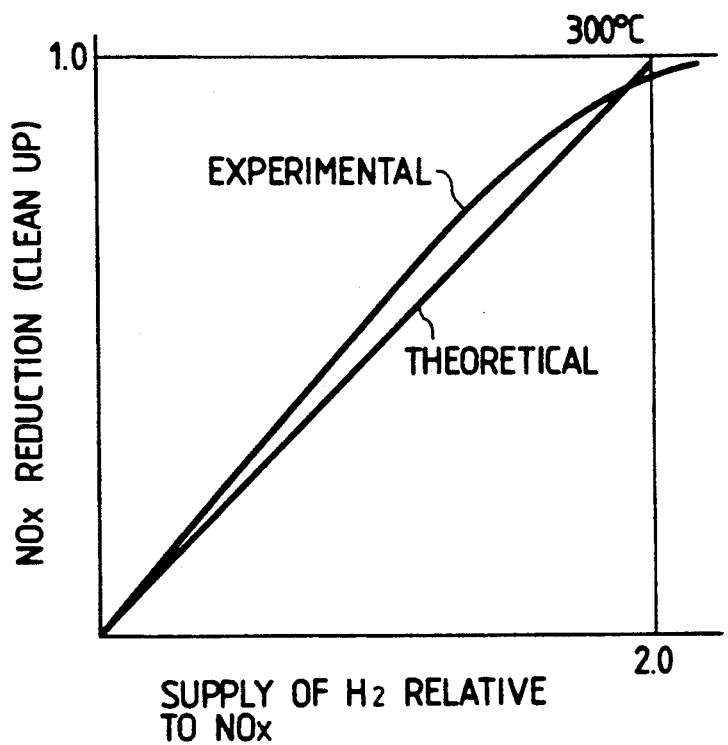
FIG. 5 is a graph showing the relationship between the relative supply of $H_2$ and the relative cleanup of NOx.

FIG. 5 is a graph showing the relationship between the relative supply of $H_2$ and the relative cleanup of NOx; the horizontal axis plots the supply of $H_2$ relative to NOx and the vertical axis plots the relative reduction (cleanup) of NOx. As FIG. 5 shows, if $H_2$ is supplied in two moles per mole of NOx, all NOx will theoretically be reduced and cleaned up on the condition that it is completely mixed with $H_2$. In fact, however, NOx and $O_2$ will not completely mix and the relative reduction of NOx is as plotted by the curve for the experimental. The curve for the experimental is partly better than that for the theoretical and this is due to the fact that the water vapor in the exhaust is converted to $H_2$ by decomposition on the noble metal based catalyst. Hence, more $H_2$ than supplied will react with NOx.

In another embodiment of the present invention, a mixer for mixing $H_2$ with the exhaust may be provided at the entrance to the catalytic converter in the apparatus for NOx by reduction and cleanup with $H_2$. In order to maintain an advantageous range of the operating temperature, the hydrogen generator which is a component of the apparatus for cleaning up nitrogen oxides may be provided at a stage in the exhaust line of the internal-combustion engine that is subsequent to the oxidation catalyst provided at the exit of the exhaust manifold. For the same purpose, the catalyzer may be provided either within or downstream of the muffler where the exhaust expands to have its temperature decreased below 200° C.

In yet another embodiment, water or water vapor to be supplied to the hydrogen generator may be replaced by aqueous methanol or the vapor of a mixture of methanol and water and this helps achieve a marked drop in the electric power required for $H_2$ generation.

In another embodiment of the present invention that relates to a method of reducing NOx by supplying $H_2$ from the hydrogen generator and reducing and cleaning up the NOx in the engine exhaust in the presence of $O_2$, a means of oxidizing HC and CO such as oxidation catalyst, a three-way catalyst or an exhaust reactor may be provided near the exhaust manifold on the engine and, at the same time, a Pt-on-zeolite catalyst may be used in the catalytic converter for NOx cleanup. If desired, the NOx catalytic converter may be provided with a sound dampening effect so that it can be made integral with the exhaust muffler.

In yet another embodiment of the apparatus for cleaning NOx by reducing it with $H_2$, adaptation for use with a diesel engine may be effected by providing a soot trap and a means of oxidizing the products of incomplete combustion upstream of the NOx catalytic converter. The method and apparatus of the present invention for reducing nitrogen oxides is not solely applicable to gasoline engines and diesel engines; they are also effectively applicable to hydrogen engines and Stirling engines although the last-mentioned are external-combustion engines. If the present invention is to be applied to a hydrogen engine, there is no need to provide a hydrogen generator and hydrogen as a fuel may simply be supplied through a bypass in the form of a controller. The present invention is also applicable to the Stirling engine with as great effects as are achieved with internal engines.

In a further embodiment of the present invention, there are provided a method and an apparatus for reducing nitrogen oxides from an internal combustion engine, in which a Pt composed catalyzer for performing a catalytic reaction between hydrogen gas and nitrogen oxides so that they are decomposed into nitrogen gas and water in the presence of nitrogen oxides and oxygen gas in the exhaust emitted by the burning of a fuel feed in the combustion chamber of the engine is provided in the exhaust system while, at the same time, a hydrogen generator for creating hydrogen gas is provided to communicate with the entrance of the catalyzer so that it can be supplied with hydrogen gas, in which method and apparatus the nitrogen oxides in the exhaust are directly reduced and cleaned up with the hydrogen gas from the hydrogen generator in a cold atmosphere not hotter than 350° C., thereby reducing said nitrogen oxides. The catalyst in the catalyzer is a Pt-based NOx catalyst such as one that has Pt carried on a porous support such as alumina, silica or zeolite. The catalyst may be of a pellet or monolith type and it may contain an alkaline earth element or a rare earth element as a cocatalyst for Pt.

It is already known that NOx can be reduced with $H_2$ on a Pt catalyst under an oxygen-free condition. See, for example, T. P. Kobylinski and B. W. Taylor, Journal of Catalysis, 33, 376 (1974), as well as K. Otto and H. C. Yao, Journal of Catalysis, 56, 21 (1979) and 66, 229 (1980), which describe the results of experiments conducted on a $NO/H_2/Ar$ system in a totally reducing atmosphere and at the stoichiometric air/fuel ratio. J. H. Jones, J. T. Kummer, K. Otto, M. Shelef and E. E. Wever, Environmental Science & Technology, 5, 790 (1971) describes successful cleanup of NO in the presence of hydrogen added to the exhaust from an actual engine. However, the experiment was conducted at an air/fuel ratio near the stoichiometric value with the oxygen concentration being varied up to 1.5%. The reference also shows that not only Pt but also Pd had catalytic activity.

As a result of intensive studies, the present inventors found that among various noble metals, only Pt was effective in promoting the reaction between NOx and $H_2$ in the presence of excess oxygen.

Various embodiments of the present invention are described below with specific reference to the accompanying drawings.

First Embodiment

Figure 6:
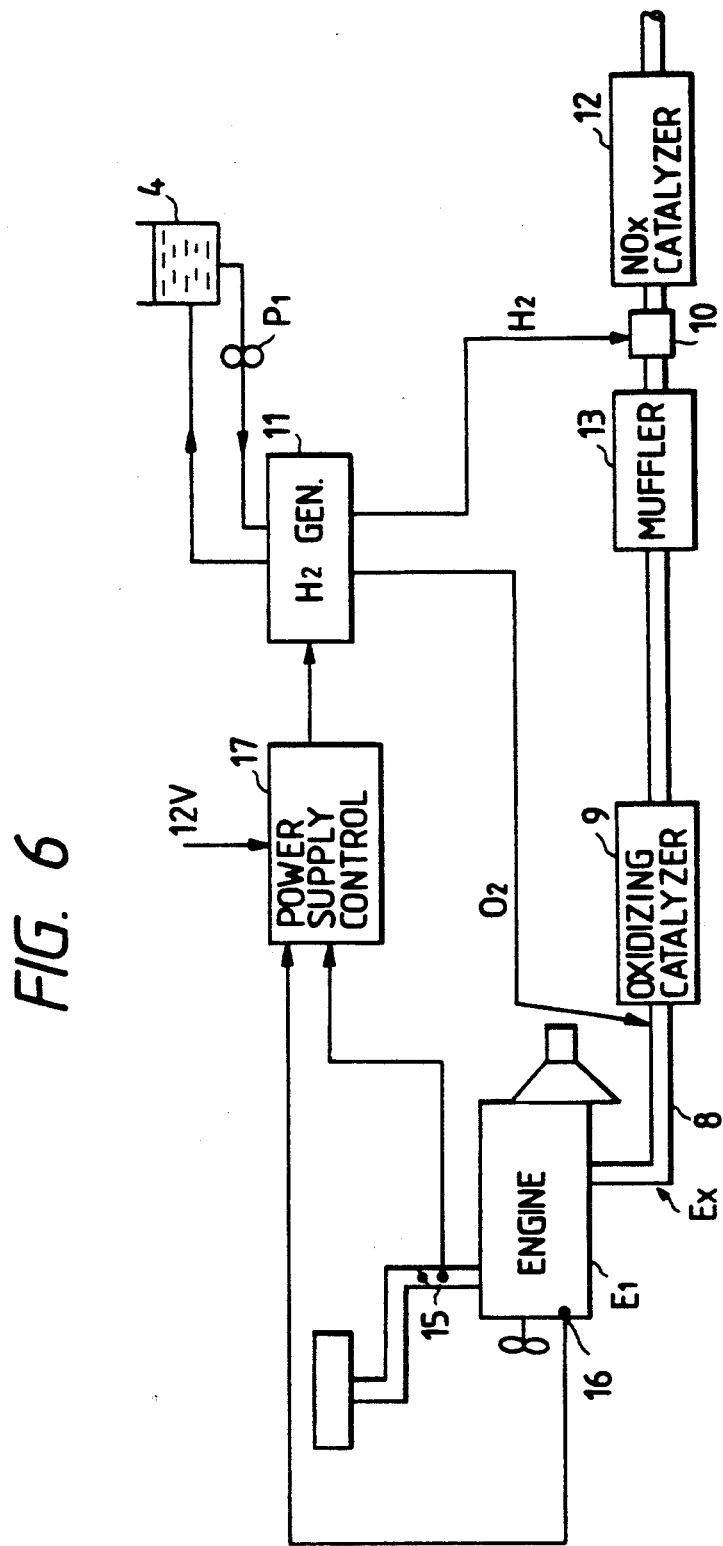
FIG. 6 is a block diagram showing the basic layout of an apparatus according to the first embodiment of the present invention.

The first embodiment of the present invention is shown in FIG. 6 and it relates to the case where the system of the invention is applied to a lean burnt engine having a displacement of 1 L. The components that are the same as those shown in FIG. 1 are identified by like numerals. The engine $E_1$ used in the first embodiment will operate at an air/fuel (A/F) ratio of 14–14.5 (slightly richer than the stoichiometric ratio or at the stoichiometric ratio) during idling, at A/F of 13–14 (on the fuel-rich side) with full load at each rotational speed and during rapid acceleration, and at A/F of 18–23 (on the lean side) under other operating conditions. Hence, the concentration of $O_2$ in the exhaust will vary from 0 to about 10%. The exhaust system Ex is composed in such a way that an oxidation catalyst 9 is provided at the exit of an exhaust manifold 8 to oxidize and clean up HC, CO and other products of incomplete combustion. Further, a reduction catalyst 12 is provided downstream of a muffler 13 as a sound damper. A mixer 10 is provided at the entrance of the reduction catalyst 12 in order to achieve uniform mixing of $H_2$ with the exhaust. The reduction catalyst 12 has Pt carried in an amount of 2 g/l on a 1.3 l monolith support coated with zeolite.

Figure 7:
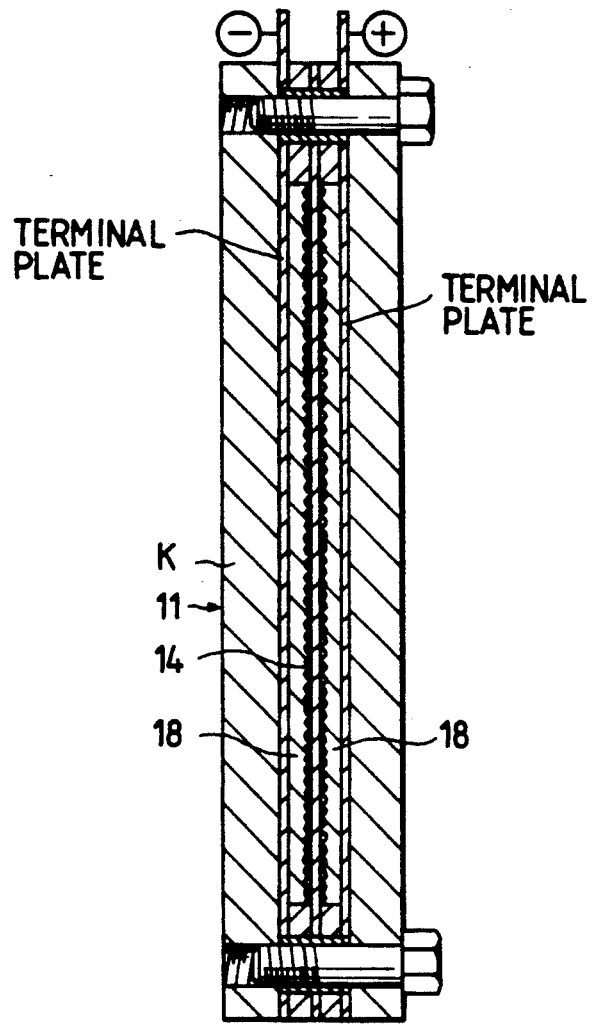
FIG. 7 is a longitudinal section of the $H_2$ generator in the apparatus shown in FIG. 6.
Figure 8:
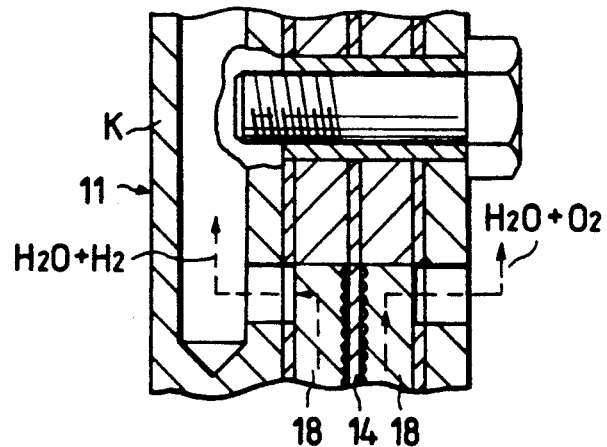
FIG. 8 is a partial enlarged section of the essential part of the $H_2$ generator in the apparatus shown in FIG. 6.

As shown specifically in FIGS. 7 and 8, a $H_2$ generator 11 generates hydrogen gas by water hydrolysis with proton conductive membranes (Nafion membranes). The $H_2$ generator 11 has such a structure that a cell case K contains a proton conductive membrane (solid electrolyte) 14, with an anode being provided on one side of the membrane and a cathode on the other side. A current collector 18 is provided to have a dc current flow between the anode and the cathodes so that water or water vapor is electrolyzed on the anode surface to evolve oxygen gas and protons. The evolved protons will move through the conductive membrane 14 to reach the cathode, whereupon hydrogen gas is generated on the cathode surface. The anode is preferably made of platinum (Pt), iridium (Ir) or some other metal that has low $O_2$ overvoltage whereas the cathode is preferably made of platinum, palladium (Pd) or some other metal that has low hydrogen overvoltage. The conductive membrane 14 having the structure described above and which is depicted in FIGS. 7 and 8 is supplied with 2–2.5 volts per sheet and six sheets are connected in series to be supplied with 12–15 volts. In the first embodiment under discussion, $H_2$ is required in an amount twice that of NOx, so depending on the concentration on of NOx in the exhaust from the engine $E_1$, the power consumption is ca. 60–70 watts at vehicle speed of 50 km/h and ca. 300 watts at maximum output and horsepower. The effect the power consumption causes on the gas mileage under various operating conditions is no more than 1–2%, which is negligible compared to 15–20% of the merit of fuel cost reduction as achieved by use of a lean burnt engine. Thus, the good fuel economy of the lean burnt engine will not be impaired by the application of the present invention.

For $H_2$ generation, about 12 g is necessary per hour if the car is running at a speed of 50 km/h. Assuming that the vehicle will run about 15,000 km a year, a water tank 4 having a capacity of 3–4 l will suffice for practical purposes.

Oxygen is produced simultaneously with the evolution of $H_2$ and it is supplied to the oxidation catalyst 9, thereby improving the efficiency of CO cleanup.

As described above, the system in accordance with the first embodiment of the present invention has the tank 4 containing a small amount of water, electrolyses water by means of the proton conductive membrane 14 in the $H_2$ generator 11 and reduces NOx with $H_2$ making use of the characteristic of the NOx reduction catalyst 12 on the low-temperature side. Hence, the present invention provides a practically advantageous system for reducing the lean burnt NOx that is capable of efficient NOx reduction irrespective of the operating A/F ratio of the engine $E_1$.

The foregoing description assumes cleanup of NOx by direct reduction with $H_2$ that is evolved by electrolysis of water with the proton conductive membranes 14. It should, however, be noted that the method of evolving $H_2$ is in no way limited to the one adopted in the first embodiment; if desired part of the engine exhaust or the gas of ventilation in the engine crankcase may be introduced into the $H_2$ generator 11 having the proton conductive membrane 14 so that the water vapor in the gases is decomposed to evolve $H_2$. In the absence of the need to provide a water tank, this modified version offers the practical advantage of being suitable for use with comparatively large cars or diesel engines.

In another modification of the first embodiment of the present invention, water or water vapor to be supplied to the hydrogen generator may be replaced with aqueous methanol or the vapor of a mixture of methanol and water and this helps achieve a marked reduction in the electric power required for $H_2$ generation. The modification to be described below is the same as described in the preceding paragraphs except that water or water vapor to be supplied to the hydrogen generator is replaced by aqueous methanol; namely, the water tank shown in FIG. 6 is charged with aqueous methanol consisting of 50% methanol and 50% water and the aqueous methanol is electrolyzed in the hydrogen generator. The cathodic reaction that occurs in this case is the same as what occurs in the electrolysis of water (the reaction for $H_2$ generation by reduction of $H^+$); on the other hand, the reaction at the anode is that for generating $CO_2$ gas by the oxidative reaction of aqueous methanol.

By changing the anodic reaction in water electrolysis from the conventional reaction for oxygen generation to the oxidative reaction of aqueous methanol, the voltage for electrolysis can be reduced by about 50% from ca. 2 volts to ca. 1 volt. In other words, the power consumption can be reduced by 50% compared to the case of water electrolysis. This is because the oxidation potential for aqueous methanol is closer to the potential for $H_2$ generation than to the potential for $O_2$ generation.

As described above, the system according to the modified version of the first embodiment of the present invention has the tank 4 containing aqueous methanol, electrolyses the aqueous methanol by means of the proton conductive membrane 14 in the $H_2$ generator to evolve $H_2$ and reduces catalyst 12 on the low-temperature side. Hence, the system is a practically advantageous system for reducing the lean burnt NOx that is capable of not only efficient NOx reduction irrespective of the operating A/F ratio of the engine $E_1$ but also achieving about 50% reduction in power consumption for bringing about comparable results to the aforementioned first embodiment of the invention.

The aqueous methanol desirably has a methanol concentration of 10 to 80%. Below 10%, the intended reduction in power consumption cannot be achieved. Beyond 80%, the voltage for electrolysis will become instable. Substituting aqueous methanol for water or water vapor is also possible in each of the $H_2$ generators that use a hydroxyl ion conductive membrane or an aqueous solution of sulfuric acid.

Second Embodiment

Figure 9:
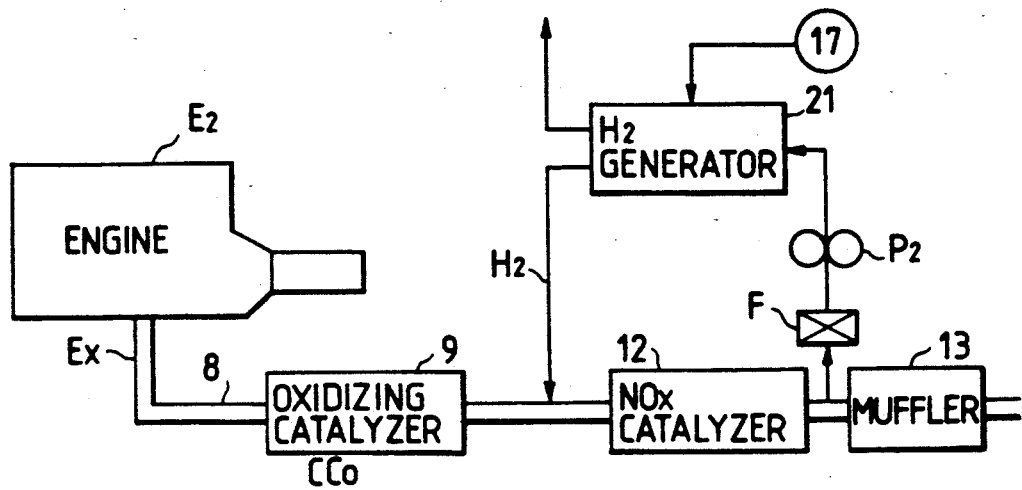
FIG. 9 is a block diagram showing the basic layout of an apparatus according to the second embodiment of the present invention.

The basic layout of the system according to the second embodiment of the present invention is shown in FIG. 9; those components which are the same as what are used in the first embodiment are identified by like numerals and will not be described in detail. The major difference from the first embodiment is that the $H_2$ generator 21 is not supplied with water but supplied with part of the exhaust from the engine $E_2$, which is aspirated by a pump $P_2$ to be introduced into the $H_2$ generator 21 (composed of a proton conductive membrane or a polymer electrolyte membrane) through a filter F for generating $H_2$. The $H_2$ generator 21 is divided into compartments by a polymer electrolyte membrane having electrodes and the exhaust is supplied at the entrance to the anode side. The water vapor in the exhaust is absorbed by the proton conductive membrane 14, where it is electrolyzed to evolve $H_2$ on the cathode side. The evolved $H_2$ is supplied at the entrance to the NOx catalyzer 12, whereby NOx in the exhaust is reduced and cleaned up. The NOx catalyst has Pt carried in an amount of 2 g/l on a 1.3 l monolith support coated with alumina. The exhaust supplied to the anode side will lose water vapor but contains $O_2$ generated by electrolysis when it is discharged to the ambient atmosphere. The power to be supplied to the proton conductive membrane 14 may be controlled in the same manner as in the first embodiment, bringing about comparative results.

Third Embodiment

Figure 10:
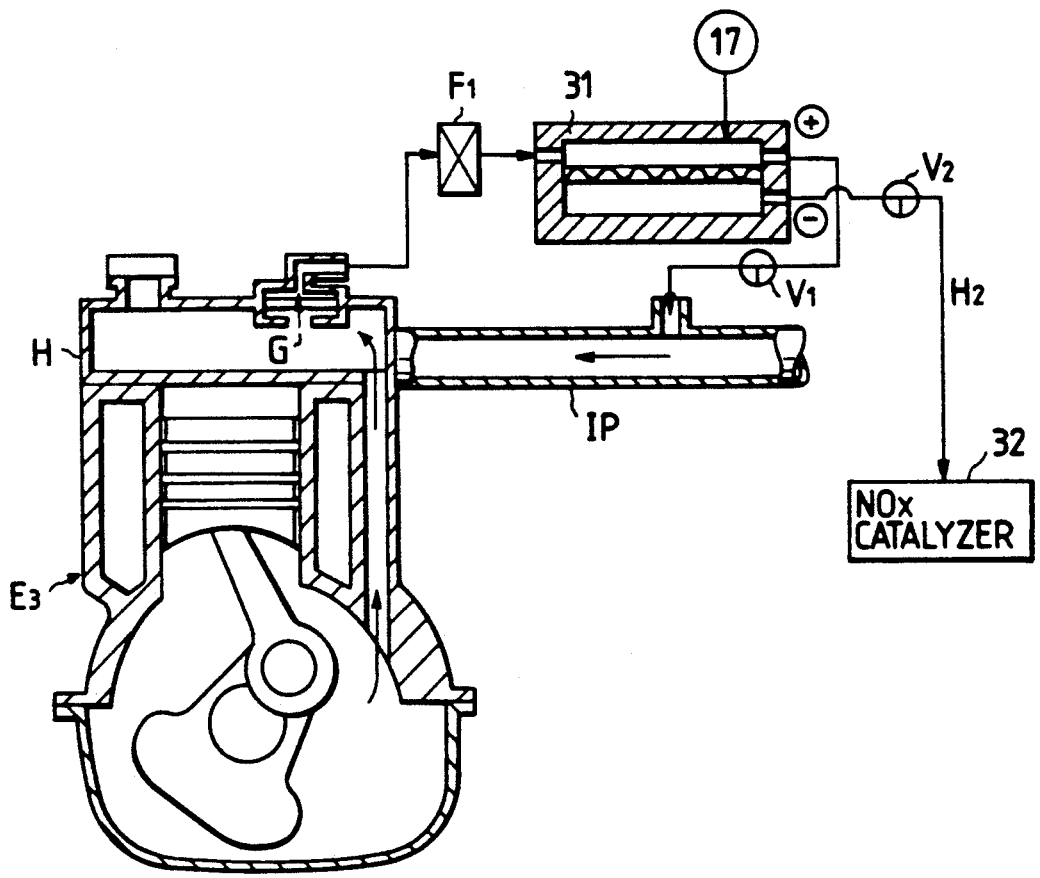
FIG. 10 is a diagram showing the basic layout of an apparatus according to the third embodiment of the present invention.

As shown in FIG. 10, the third embodiment differs from the first and second embodiments in that the water vapor containing gas to be supplied to the electrolytic cell 31 is replaced by a blow-by gas G that occurs in the engine $E_3$. The blow-by gas G obtained from the cylinder head H of the engine $E_3$ by removing the oil mist is further freed of foreign matter and oil mist by means of the filter $F_1$ before it is introduced into the electrolytic cell 31. As is ordinary ventilation, the gas emitted from the electrolytic cell 31 is returned to the intake pipe IP so that it is admitted into the engine $E_3$ together with air intake. A regulating valve $V_1$ is provided halfway between the electrolytic cell 31 and the intake pipe IP so that the pressure in the cell will in no case be negative. Hydrogen gas is evolved on the cathode side and it is supplied to the NOx catalyst 32 after pressure adjustment to a predetermined level by means of a regulating valve $V_2$. The third embodiment will achieve comparable results to the first and second embodiments.

Fourth Embodiment

The fourth embodiment is essentially the same as the foregoing embodiments except that the $H_2$ generator 11 shown in FIGS. 7 and 8 uses a hydroxyl ion conductive membrane 14 rather than the proton conductive membrane. The $H_2$ generator 11 has such a structure that a cell case K contains the hydroxyl ion conductive membrane (solid electrolyte) 14, with an anode being provided on one side of the membrane and a cathode on the other side. A current collector 18 is provided to have a dc current flow between the anode and the cathode so that water or water vapor is electrolyzed on the cathode surface to evolve hydrogen gas and hydroxyl ions. The generated hydroxyl ions will move through the conductive membrane 14 to reach the anode, whereupon oxygen gas is generated on the anode surface.

As described above, the system in accordance with the fourth embodiment of the present invention has the tank 4 containing a small amount of water, electrolyses water by means of the OH ion conductive membrane 14 in the $H_2$ generator 11 to produce $H_2$, and reduces NOx with $H_2$ making use of the characteristic of the NOx reduction catalyst on the low-temperature side. Hence, the system is a practically advantageous system for reducing the lean burnt NOx that is capable of efficient NOx reduction irrespective of the operating A/F ratio of the engine $E_1$, bringing about comparable results to those achieved by the foregoing embodiments. The NOx catalyst has Pt carried in an amount of 2 g/l on a 1.3 l monolith support coated with silica.

Fifth Embodiment

Figure 11:
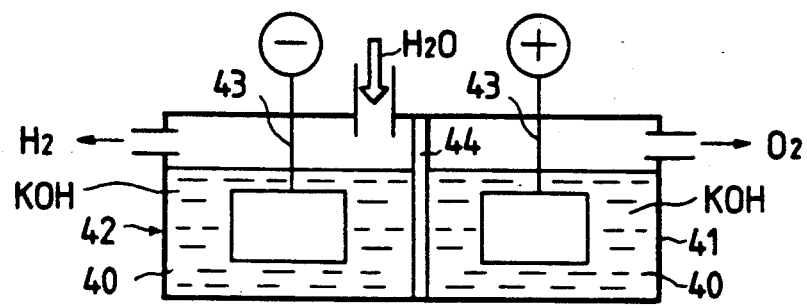
FIG. 11 is a diagram showing the basic layout of the $H_2$ generator in an apparatus according to the fifth embodiment of the present invention.

FIG. 11 shows a $H_2$ generator that is used in the system according to the fifth embodiment of the present invention. The $H_2$ generator indicated by 41 electrolyses water using an aqueous solution of potassium hydroxide 40. The $H_2$ generator 41 has such a structure that a cell case 42 is divided into two compartments by an ion conductive membrane 44, with an anode being provided in one compartment and a cathode in the other compartment. A current collector 43 is provided to have a dc current flow between the anode and the cathode, so that water is electrolyzed on the cathode surface to generate hydrogen gas and hydroxyl ions. The generated hydroxyl ions move through the membrane 44 to reach the anode, whereupon oxygen gas is evolved on the anode surface. The anode is preferably made of platinum (Pt), nickel (Ni) or some other metal that has low $O_2$ overvoltage whereas the cathode is preferably made of platinum, palladium (Pd), iron (Fe) or some other metal that has low hydrogen overvoltage. The $H_2$ generator 41 having the structure described above and which is depicted in FIG. 11 is supplied with a voltage of 2 to 2.5 volts per cell between anode and cathode, with six cell being connected in series to be supplied with 12 to 15 volts.

As described above, the system in accordance with the fifth embodiment of the present invention has a tank (not shown) containing a small amount of water, electrolyses water in the aqueous solution of potassium hydroxide 40 in the $H_2$ generator 41 to produce $H_2$, and reduces NOx with $H_2$ making use of the characteristic of the NOx reduction catalyst on the low-temperature side. Hence, the system is a practically advantageous system for reducing the lean burnt NOx that is capable of efficient NOx reduction irrespective of the operating A/F ratio of the engine, bringing about comparable results to those achieved by the foregoing embodiments.

Sixth Embodiment

Figure 12:
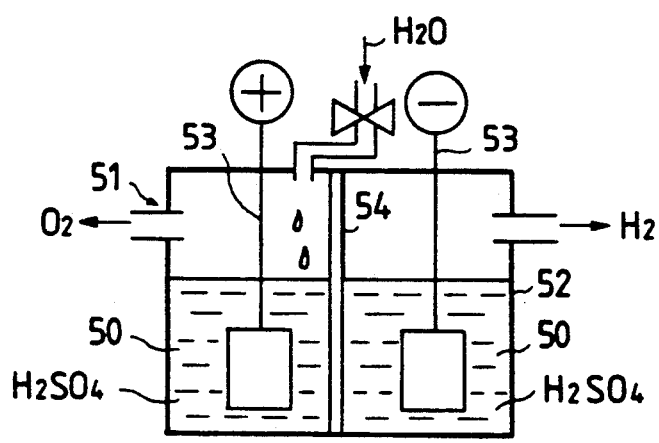
FIG. 12 is a diagram showing the basic layout of the $H_2$ generator in an apparatus according to the sixth embodiment of the present invention.

FIG. 12 shows a $H_2$ generator that is used in the system according to the sixth embodiment of the present invention. The $H_2$ generator indicated by 51 electrolyses water using an aqueous solution of $H_2SO_4$ 50. The $H_2$ generator 51 has such a structure that a cell case 52 is divided into two compartments by an ion conductive membrane 54, with an anode being provided in one compartment and a cathode in the other compartment. A current collector 53 is provided to have a dc current flow between the anode and the cathode, so that water is electrolyzed on the anode surface to generate oxygen gas and protons. The generated protons move through the membrane 54 to reach the cathode, whereupon hydrogen gas is evolved on the cathode surface. The anode is preferably made of platinum (Pt), iridium (Ir) or some other metal that has low $O_2$ overvoltage whereas the cathode is preferably made of platinum, palladium (Pd) or some other metal that has low hydrogen overvoltage. The $H_2$ generator 51 having the structure described above and which is depicted in FIG. 12 is supplied with a voltage of 2 to 2.5 volts per cell between anode and cathode, with six cells being connected in series to be supplied with 12 to 15 volts.

As described above, the system in accordance with the sixth embodiment of the present invention has a tank (not shown) containing a small amount of water, electrolyses water in the aqueous solution of sulfuric acid in the $H_2$ generator 51 to produce $H_2$, and reduces NOx with $H_2$ making use of the characteristic of the NOx reduction catalyst on the low-temperature side. Hence, the system is practically advantageous system for reducing the lean burnt NOx that is capable of efficient NOx reduction irrespective of the operating A/F ratio of the engine $E_1$, bringing about comparable results to those achieved by the foregoing embodiments.

Seventh Embodiment

Figure 13:
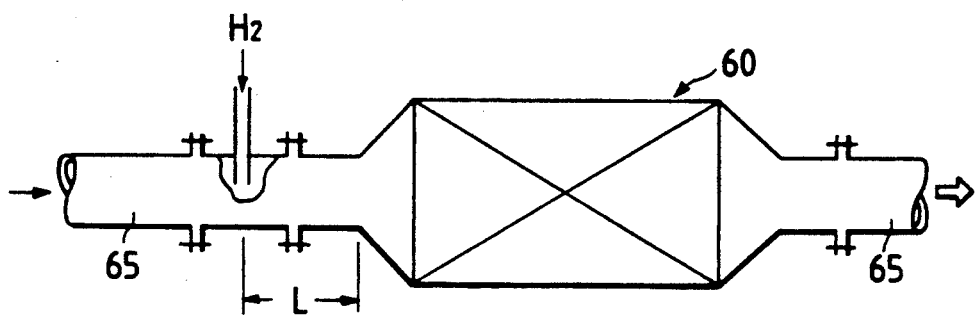
FIG. 13 is a diagram showing the basic layout of the NOx converter in an apparatus according to the seventh embodiment of the present invention.
Figure 14:
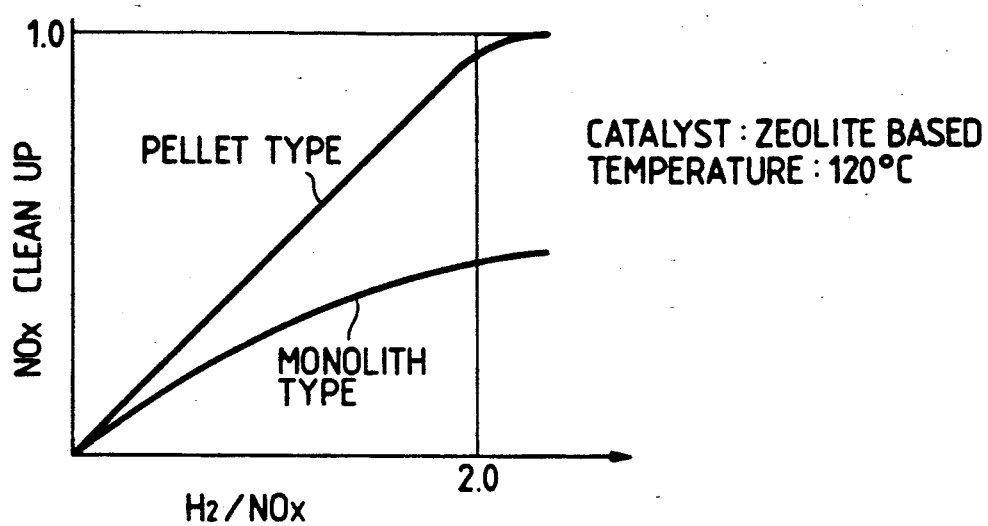
FIG. 14 is a graph showing the Nox cleanup performance of the converter shown in FIG. 13.

In the foregoing embodiments, it was found that the system for reducing NOx from engine exhaust by reducing and cleaning up the NOx with the combination of either a zeolite based catalyst or a Pt/zeolite catalyst and an apparatus for generating $H_2$ by electrolysis of water with a proton conductor experienced substantial differences in the performance of NOx reduction depending upon the conditions for $H_2$ supply and on the construction of the apparatus. FIG. 13 shows the system according to the seventh embodiment of the present invention, in which an engine exhaust containing NOx and $O_2$ is allowed to flow through the catalyzer while $H_2$ is supplied upstream of the catalytic converter. The cleanup of NOx as accomplished in this embodiment is shown in FIG. 14. The horizontal axis of the graph shown in FIG. 14 plots the supply of $H_2$ relative to NOx, with 2.0 referring to the case where $H_2$ is supplied in two moles per mole of NOx. The vertical axis of the graph plots the relative cleanup of NOx by reduction, with 1.0 referring to complete cleanup of NOx.

Figure 15:
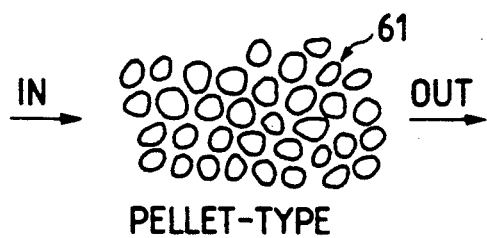
FIG. 15 is a diagram showing the structure of a pellet-type catalyst to be used in the converter shown in FIG. 13.
Figure 16:
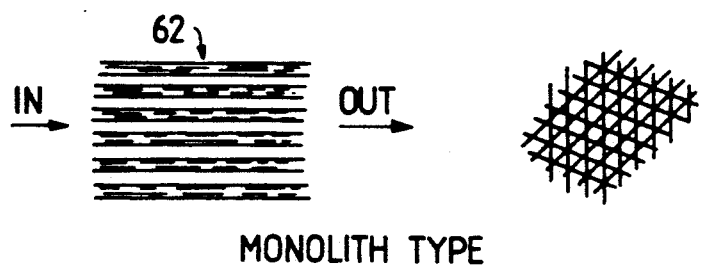
FIG. 16 is a diagram showing the structure of a monolith-type catalyst to be used in the converter shown in FIG. 13.

If the converter indicated by 60 in FIG. 13 is packed with a pellet-type catalyst as shown by 61 in FIG. 15, high NOx cleanup is achieved as is clear from FIG. 14. If a monolith-type catalyst as indicated by 62 in FIG. 16 is used in place of the pellet type, the NOx cleanup deteriorates given the same supply of $H_2$. In other words, more $H_2$ must be allowed to flow to attain the same NOx cleanup and, hence, more electric power is necessary to generate $H_2$, leading to more fuel consumption by the engine.

The pellet-type catalyst 61 shown in FIG. 15 has the advantage that even if $H_2$ does not mix well with the exhaust gas to provide a concentration profile of $H_2$ at the entrance to the catalyzer, the two gases will intermix thoroughly as they pass through interstices between pellets that form tortuous pathways, thereby producing a uniform mixture of $H_2$ and the exhaust gas.

The monolith-type catalyst 62 has a honeycomb structure consisting of many hexagonal holes. The individual holes are independent of one another in a direction parallel to the gas flow, so if there is a concentration profile of $H_2$ at the entrance to the catalyzer, the gases will not readily mix together in adjacent channels as they flow toward the exit end. According to the results of an actual experiment, the thickness of the exhaust pipe could not be increased significantly on account of space limits and the gas flow rate was so fast as to create a high-concentration zone close to the center of the catalyzer, thus resulting in substantial failure to supply $H_2$ to the peripheral portion of the monolith catalyst. Hence, the $H_2$ availability of the monolith-type catalyst is lower than that of the pellet type.

From the viewpoint of its performance as a component of the engine exhaust system, the pellet-type catalyst has the disadvantage that the pellets will readily disintegrate into particles upon vibration friction and that the cross-sectional area of the gas passage is so small as to cause a greater drag resistance and, hence, a higher exhaust pressure, leading to deterioration of the performance of the engine itself. Therefore, a monolith-type catalyst is desirably used in the engine exhaust system but if this is the case, special care is necessary for $H_2$ supply.

Figure 17:
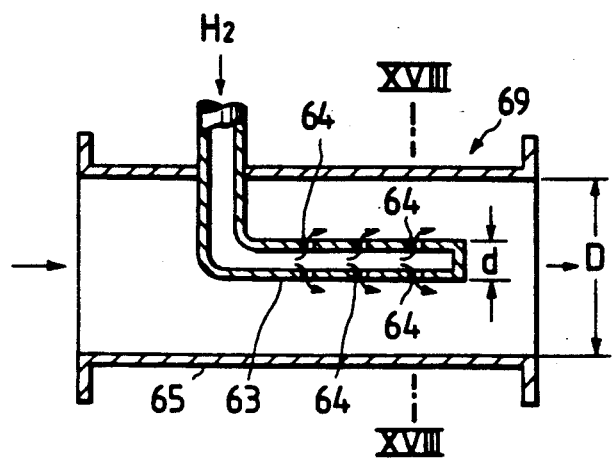
FIG. 17 is a longitudinal section showing the basic layout of the mixer in an apparatus according to the seventh embodiment of the present invention.
Figure 18:
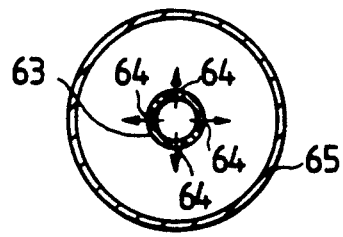
FIG. 18 is a cross section taken on line XVIII—XVIII of FIG. 17.

Under the circumstances, the seventh embodiment uses an apparatus of simple construction that is capable of mixing $H_2$ uniformly with the exhaust gas in a monolith-type catalyst so as to achieve a higher NOx cleanup than when the pellet-type catalyst is used. A mixing apparatus generally indicated by 69 in FIG. 17 has a $H_2$ injecting nozzle 63 inserted whose basic structure is shown specifically in FIGS. 17 and 18. The nozzle 63 is in a hollow cylindrical form and bent in an L-shape in a direction parallel to the exhaust flow and it has a plurality of injection orifices 64 formed radially in the side wall. The number of orifices 64 is advantageously four to six per row and they are arranged in either one or more rows (in the case shown in FIG. 17, the orifices 64 are arranged in three rows).

Figure 19:
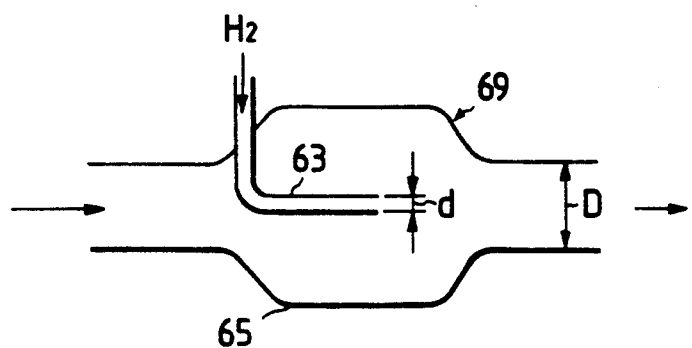
FIG. 19 is a diagram showing the basic layout of a modification of the mixer in an apparatus according to the seventh embodiment of the present invention.
Figure 20:
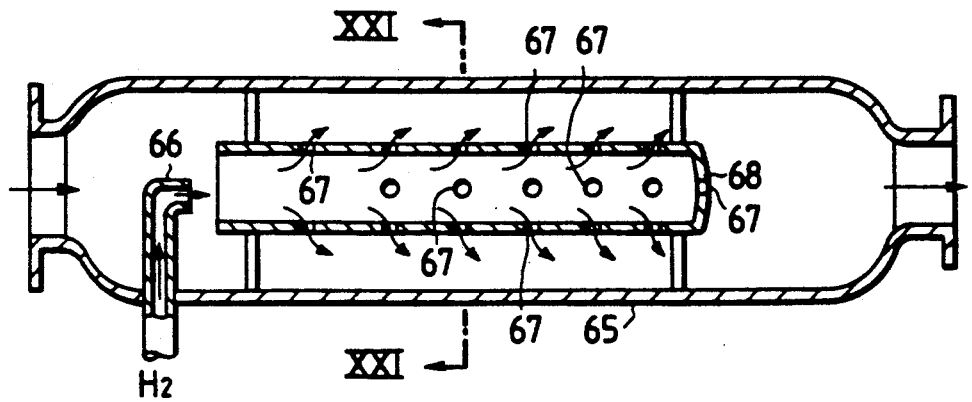
FIG. 20 is a longitudinal section showing another modification of the mixer in an apparatus according to the seventh embodiment of the present invention.
Figure 21:
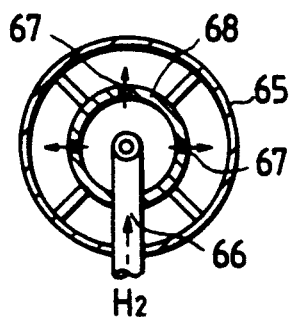
FIG. 21 is a cross section taken on line XXI—XXI of FIG. 20.

The outside diameter, d, of the nozzle 63 must be at least 20% of the inside diameter, D, of the exhaust pipe 65. The drag resistance of the exhaust pipe will increase as the value of d increases. Hence, in place of increasing d, part of the exhaust pipe 65 is flared as shown in FIG. 19. The distance, L, from the nozzle 63 to the converter 60 must be at least twice D but no further improvement is achievable even if L is greater than D by a factor 10 or more. Another configuration that can be assumed by the mixing apparatus is shown in FIGS. 20 and 21. As shown, the $H_2$ agitating zone is composed of a substantially double-wall structure that consists basically of a small-diameter $H_2$ injecting nozzle 66 and a large-diameter tube 68 with a bottom that is provided with a plurality of injection orifices 67 in the side wall. Injected $H_2$ will first mix with the exhaust that flows into the nozzle 66 under the dynamic pressure of the exhaust and the mixed gas will flow through orifices 67 to go outside the tube 68, undergoing further mixing by the exhaust flowing between the tube 68 and the outer tube. This mixing process through two stages insures that $H_2$ will mix with the exhaust in a complete and uniform way.

The sizes (diameters or cross-sectional areas) of the tube 68 and the outer tube have substantial effects on the mixing efficiency and if the tube 68 is too small, most of the exhaust will flow between the two tubes and its dynamic pressure cannot be fully utilized. With reference to FIGS. 20 and 21, the ratio of D to d (D: the diameter of the outer tube; d: the diameter of the inner tube) is advantageously in the range of ca. 3 to 1.7, with the best result being attained at a value near 2.

The seventh embodiment of the present invention having the construction described above accomplishes satisfactory mixing of $H_2$ with the exhaust and even a monolith-type catalyst will achieve a comparable NOx cleanup to a pellet-type catalyst. Compared for the same cleanup, the system of this embodiment can save on the supply of $H_2$ by ca. 30 to 60% and, hence, less power is needed for $H_2$ generation, thereby reducing the adverse effects on the engine output and fuel economy.

Consider, for example, the case where a 1.6 l lean burnt gasoline engine is operated at a conventional typical point, where the engine is running at a rotational speed of 2000 rpm producing a torque of 40 Nm. In this case, NOx is discharged in an amount of 0.22 l/min (based on a change with $NO_2$) in the exhaust and the flow rate of $H_2$ that is necessary to clean up the discharged NOx by reduction with $H_2$ is 0.66 l/min. In order to generate $H_2$ in an amount of 0.66 l/min, a power of 192 watts must be supplied to a $H_2$ generator using a polymer proton conductive membrane.

If the mixing of $H_2$ with the exhaust is promoted by the apparatus shown in FIGS. 20 and 21 where $D/d=2$, $H_2$ need only to be supplied in an amount of about 0.44 l/min which is twice that of NOx(i.e. twice that of $NO_2$ by mole ratio) and the power consumption is lowered to 128 watts, achieving 64 W saving. The relationship between the power consumption by an automobile carrying a 1.6 l engine and its fuel economy varies with the operating conditions but is generally held to be in the range of 0.1 to 0.25% /A in terms of the effect on fuel economy per ampere of current. Since the power source is a battery capable of supplying a voltage of 12 volts, 64 watts is equivalent to 5.33 A. Assuming 0.2% /A, the system offers a practical advantage in that the fuel consumption can be reduced by 1.06%.

Eighth Embodiment

Figure 22:
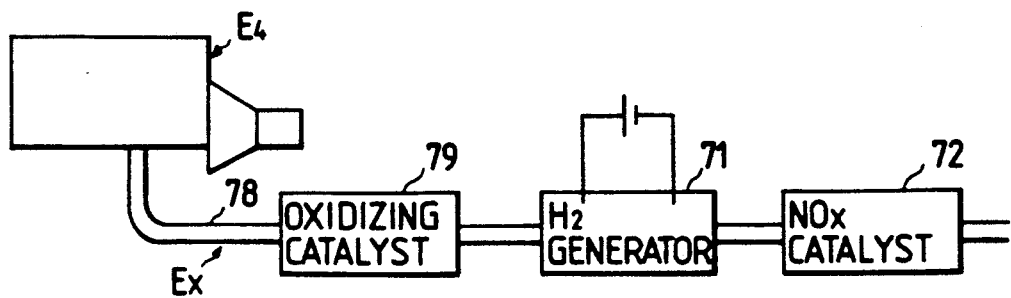
FIG. 22 is a block diagram showing the basic layout of an apparatus according to the eighth embodiment of the present invention.

FIG. 22 shows an apparatus for cleaning up nitrogen oxides in accordance with the eighth embodiment of the present invention. As shown, a hydrogen generator 71 for electrolyzing water vapor in the exhaust to evolve the necessary amount of hydrogen gas is provided in series to the exhaust line and, at the same time, a catalyzer 72 is provided for causing a catalytic reaction between the hydrogen gas and nitrogen oxides so that they are decomposed into nitrogen gas and water.

The hydrogen generator 71 is of such a structure that it has an anode provided on one side of a proton conductive solid electrolyte and a cathode on the other side, with a dc current being applied between the anode and the cathode so that water vapor is electrolyzed on the anode surface to produce oxygen gas and protons. The protons move through the solid electrolyte to reach the cathode, whereupon they are used to generate hydrogen gas on the cathode surface. The anode is preferably made of platinum (Pt), iridium (Ir) or some other metal that has low oxygen overvoltage whereas the cathode is preferably made of platinum, palladium (Pd) or some other metal that has low hydrogen overvoltage. The proton conductive solid electrolyte is made of a sinter of an acceptor doped perovskite-type oxide such as strontium oxide ceria ($SrCeO_3$), strontium oxide zirconium ($SrZrO_3$) or calcium oxide zirconium. Preferred examples of the acceptor are oxides of such elements as yttrium (Y), neodymium (Nd) and ytterbium (Yb). The solid electrolyte under consideration exhibits satisfactory proton conduction at 400° to 700° C., so the hydrogen generator 71 in the system according to the eighth embodiment of the present invention is desirably operated at 400° to 700° C.

The catalyzer 72 uses either a Pt/zeolite or Pt/alumina catalyst. The relationship between temperature and the NOx cleanup by these catalysts is as shown in FIG. 4B. In the low-temperature range not higher than 200° C., the reaction between hydrogen and NOx occurs selectively, making it possible to accomplish very efficient cleanup of NOx through reduction with hydrogen. On the other hand, at 200° to 350° C. or higher, the reaction between HC and NOx occurs predominantly, with HC contributing to the reduction of NOx.

As described above, the hydrogen generator 71 and the catalyzer 72 which are two major components of the apparatus for cleaning up nitrogen oxides according to the eighth embodiment of the present invention have their own advantageous ranges of operating temperature. Therefore, the hydrogen generator 71 is preferably provided at a stage subsequent to an oxidation catalyst 79 that is located at the exit of an exhaust manifold 78 in the exhaust line Ex of an internal-combustion engine $E_4$ whereas the catalyzer 72 is preferably provided either within or downstream of a muffler (not shown) where the exhaust expands to have its temperature decrease below 200° C. Having this construction, the system according to the eighth embodiment of the present invention will bring about almost comparable results to those obtained in the foregoing embodiments.

Ninth Embodiment

In each of the embodiments described above, either a zeolite based catalyst or a Pt/zeolite catalyst is used and hydrogen as generated in the hydrogen generator is supplied at the entrance to the catalyzer so that NOx in the exhaust is reduced with $H_2$. In this way, high NOx cleanup can be achieved even if the exhaust contains $O_2$ at high concentration.

However, compared to conventional NOx catalysts such as three-way catalyst and a Cu/zeolite catalyst, the catalysts used in the foregoing embodiments are only effective in reactions that take place at low temperatures; the conventional catalysts use SV values (the flow rate of a gas in $cm^3/h$ per unit volume of catalyst in $cm^3$) in the range of 50,000 to 100,000 whereas the catalysts for the present invention require the use of smaller SV values (e.g., 10,000 to 60,000) in consideration of the reaction rate. If the system of the present invention is to be installed on a vehicle, the temperature of the gas at the entrance to the NOx converter is such that the converter must be positioned downstream of the exhaust line, typically near the exhaust muffler. However, certain types of vehicle have such a construction that only converters for high SV values (i.e., large converters) can be installed and, hence, the system of the present invention is applicable to all types of vehicles.

Under the circumstances, the system according to the ninth embodiment of the present invention facilitates the installation of the converter by using a muffler that can accommodate the NOx catalyst to realize a compact structure. Further, this system which accommodates the catalyst in the muffler is yet capable of effective NOx cleanup by adopting certain temperature conditions.

Figure 24:
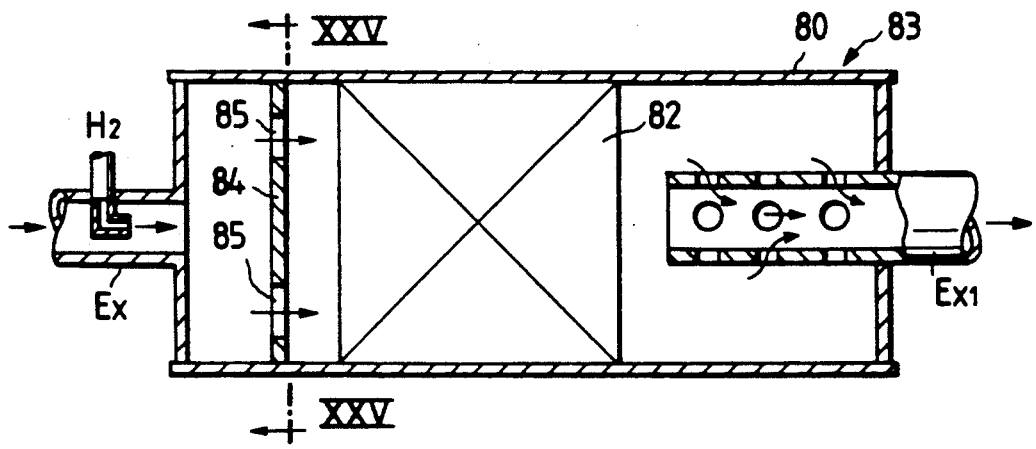
FIG. 24 is a longitudinal section showing the basic layout of an integral combination of an exhaust muffler and a catalytic converter in an apparatus according to the ninth embodiment of the present invention.
Figure 25:
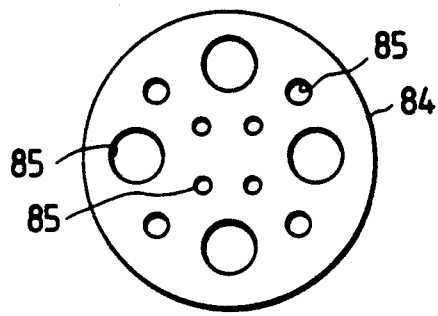
FIG. 25 is a cross section taken on line XXV—XXV of FIG. 24.

FIGS. 24 and 25 show the basic layout of the system according to the ninth embodiment of the present invention. As shown, a NOx catalyst 82 is accommodated in an exhaust muffler 80 and this offers a great advantage from the viewpoint of installation space since there is not need to connect a NOx converter and the exhaust muffler in series but only one of them need be provided.

The exhaust muffler is typically located at the very end of the engine exhaust line and the temperature of the gas at the entrance to the muffler is inevitably low since it has been cooled before reaching the muffler. The inlet gas temperature is the highest when the engine is running at a maximum rotational speed to produce a maximum horsepower but even in that case, the temperature of interest is 150° to 200° C. and under normal operating conditions that are often adopted, the temperature is only about 100° to 150° C.

Conventional three-way catalysts and Cu/zeolite catalysts are not expected to achieve satisfactory reaction unless the temperature is at least 300° to 400° C., so these catalysts cannot be accommodated in the muffler. In the foregoing embodiments, we have shown that NOx can be cleaned up at low temperatures if it is reduced with $H_2$ but the temperature involved is about 150° to 300° C., which is within a range somewhat higher than the temperature at the entrance to the exhaust muffler.

The present inventors conducted various experiments in order to investigate as to which catalyst component should be selected for allowing the NOx reducing catalyst to exhibit satisfactory activity when it is supplied with $H_2$ in the presence of $O_2$. As a result, the inventors found that Pd and Rh had no activity and that Cu had only low activity whereas Pt exhibited high activity. However, Pt has to be highly dispersed and, to this end, it must be carried on a support of high surface area (at least 100 $m^2/g$), such as alumina, silica or zeolite.

Figure 23:
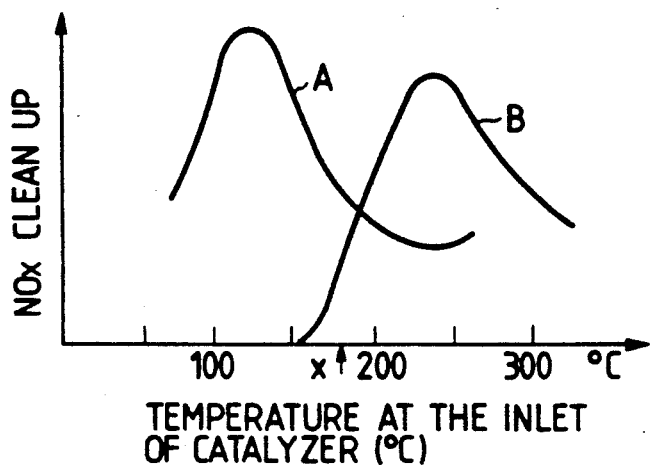
FIG. 23 is a graph showing the NOx cleanup performance of the apparatus shown in FIG. 22.

The present inventors made further studies on the NOx reducing catalyst, as well as on the preliminary treatment to be performed before mixing with $H_2$. The results are shown in FIG. 23. When the engine exhaust was mixed with $H_2$ and the mixture introduced to the NOx reducing catalyst (Pt on alumina), the catalyst activity was the highest at a temperature near 250° C., as indicated by curve B in FIG. 23.

When an after-burner, a reactor, a three-way catalyst, an oxidation catalyst, etc. were provided near the engine manifold to oxidize CO and HC in the exhaust so that their contents would be reduced or eliminated before being mixed with $H_2$ and introduced into the NOx converter (catalyst), the temperature for catalyst's activity shifted toward the lower side, with high activity being presented at 100° to 150° C., as indicated by curve A in FIG. 23. This temperature coincided with the gas temperature at the entrance to the exhaust muffler and could only be attained by incorporating the Pt/zeolite catalyst 82 in the exhaust muffler 80. The method of reducing NOx with the catalyst after removing HC and CO achieves better cleanup and offers the practical advantage of preventing the formation of soot on the catalyst due to the incomplete reaction between HC and $O_2$. FIGS. 24 and 25 show a catalytic converter 83 that is provided with a sound dampening effect by incorporating the monolith catalyst 82 (of Pt/zeolite system) in the exhaust muffler 80.

Figure 26:
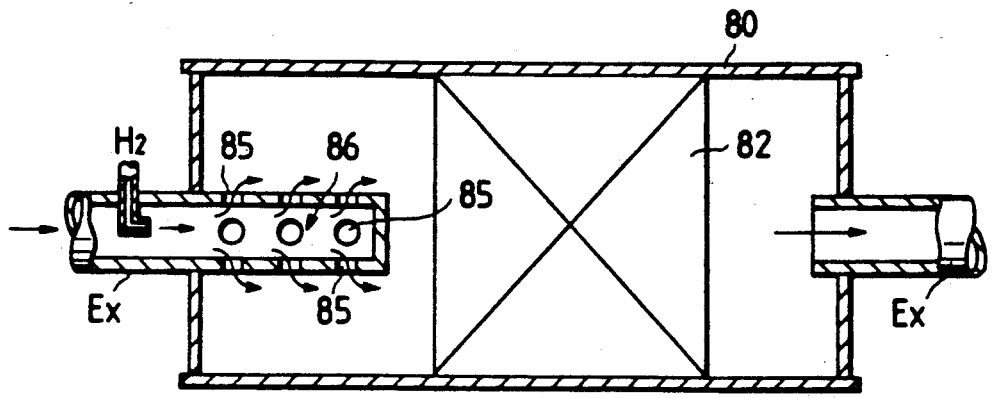
FIG. 26 is a longitudinal section showing the basic layout of another integral combination of an exhaust muffler and a catalytic converter in an apparatus according to the ninth embodiment of the present invention.

The exhaust mixed with $H_2$ is admitted at the entrance to the catalytic converter 83 in the direction indicated by an arrow, whereupon the exhaust impinges against a mixing plate 84. As it passes through a plurality various sized holes 85 in the plate 84, the exhaust mixes thoroughly with $H_2$ and the mixture flows into the monolith catalyst 82. The mixing plate 84 has no holes in the center where the exhaust flow attains a maximum speed, so $H_2$ will not be concentrated in the center of the monolith catalyst. The holes 85 are different in diameter, so the mixture of the exhaust flow with $H_2$ will pass through those holes at different, not only causing the gases to be agitated but also producing a sound dampening effect by interference. In the system shown in FIG. 24, an interference tube Ex1 is provided after the monolith catalyst 82 to provide an even greater sound dampening effect. FIG. 26 shows a modified version of the system according to the ninth embodiment of the present invention and it brings about the same result as is achieved by the system shown in FIGS. 24 and 25; the only difference is that the mixing plate 84 is replaced by a mixing pipe 86 in a hollow tubular form. Whichever configuration is adopted, the system according to the ninth embodiment of the present invention features an integral combination of the catalytic converter 83 and the exhaust muffler 80 and, hence, presents a practical advantage in that it is compact enough to provide great ease in installation on a vehicle. At the same time, the system will insure high NOx cleanup over the full operating range of the engine.

Tenth Embodiment

Nitrogen oxides (NOx) produced in the cylinder of a diesel engine must be removed by a post-treatment such as a treatment with an exhaust catalyst. Compared to the gasoline engine, the diesel engine performs combustion in the presence of greater excess of air. In the diesel engine, the excess of air relative to fuel (a measure for the factor by which the stoichiometric ratio must be multiplied to perform combustion) typically ranges from 1.1 to 7 and even greater (for a gasoline engine supplied with a premixed uniform air-fuel mixture, the factor is 0.8 to 1.3). Hence, the exhaust from the diesel engine contains $O_2$ at high concentration whereas it contains smaller amounts of NOx reducing materials such as CO, HO and $H_2$, thereby presenting extreme difficulty in catalytically reducing and cleaning up NOx as a post-treatment of the exhaust.

Figure 27:
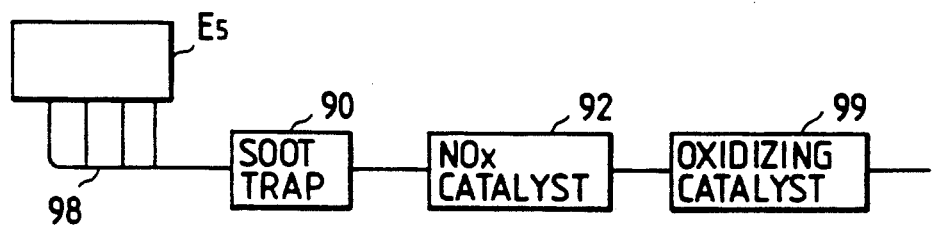
FIG. 27 is a block diagram showing the basic layout of a prior art version over which the apparatus according to the tenth embodiment of the present invention is an improvement.

A diesel engine exhaust line that is under intensive review in various fields is shown in FIG. 27. The gas emitted from the diesel engine $E_5$ is first fed to a trap 90 where "diesel particulate" such as soot are removed. Then, NOx in the exhaust is reduced in a NOx catalyzer 92 and HC and other products of incomplete combustion are removed by oxidation in an oxidation catalyzer 99. To enhance the reducing power of the NOx catalyzer 92, part of the fuel is injected into an exhaust manifold 98 or the same is reinjected into the cylinder of the engine at the end of the stroke of combustion, so that the concentration of HC and other products of incomplete combustion in the exhaust will be made satisfactorily higher than that of NOx before the exhaust is introduced into the NOx catalytic converter.

However, NOx cannot be cleaned up satisfactorily with HC unless the latter is supplied at a higher concentration than NOx. Further, depending on the catalyst to be used in the NOx converter, the temperature of the gas at the exit of the NOx converter or the temperature of the gas at the entrance of the oxidation catalytic converter 99 will typically drop to a temperature in the range of 300° to 200° C. or below and, hence, excess HC that has passed through the NOx converter 92 cannot be efficiently oxidized to lower its content. Under the circumstances, not only does the fuel consumption increase but also no marked improvement in the NOx cleanup can be expected because the more one wants to reduce the NOx content, the more HC will be discharged.

Figure 28:
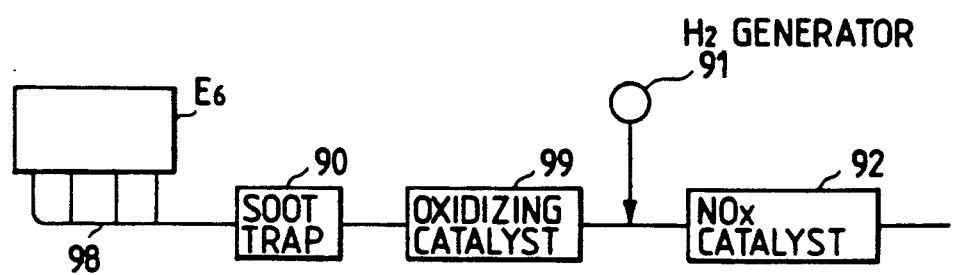
FIG. 28 is a block diagram showing the basic layout of the apparatus according to the tenth embodiment of the present invention.

The system according to the tenth embodiment of the present invention features the ability to reduce nitrogen oxides without increasing the HC level of the exhaust from an engine such as a diesel engine that is to be operated in a zone having high excess of air compared to fuel. A typical example of this system is shown in FIG. 28. Water as possessed by a $H_2$ generator 91 or the water vapor in the exhaust from the engine $E_6$ is directly electrolyzed to yield hydrogen gas, which is supplied as a reducing agent into a NOx converter 92. This enables the NOx in the exhaust to be reduced at low temperature. Hence, in accordance with the tenth embodiment, the exhaust from the engine $E_6$ is first supplied to the soot trap 90 where it is freed of diesel particulate; then, CO and HC are oxidatively removed from the exhaust by an oxidation catalyst or some other means of removing the products of incomplete combustion; the remaining exhaust gas is mixed with $H_2$ and supplied into the NOx converter 92, in which NOx is cleaned up by reduction with $H_2$. This procedure offers the practical advantage of achieving satisfactory reduction in the content of HC since HC and other products of incomplete combustion can be oxidized in a hot exhaust gas.

What is claimed is:

1. A method for reducing nitrogen oxides in exhaust gases from an internal combustion engine, comprising the steps of:

supplying a hydrogen gas from a hydrogen generator for mixing into exhaust gases including nitrogen oxides and oxygen gas at an upstream position of the catalyzer and in a muffler or a downstream position of said muffler, said muffler being positioned close to said catalyzer, said catalyzer and muffler being provided in an exhaust line, said hydrogen generator producing said hydrogen gas by electrolysis of water or water vapor and said catalyzer causing a catalytic reaction between the hydrogen gas and nitrogen oxides to decompose into nitrogen gas and water vapor; and directly reducing said nitrogen oxides in said exhaust gases with said hydrogen gas under a low temperature atmosphere of not higher than 350°.

2. An apparatus for reducing nitrogen oxides from exhaust gases including nitrogen oxides and an oxygen gas from an internal combustion engine, said apparatus comprising:

a catalyzer for reducing said nitrogen oxides into a nitrogen gas and water vapor by a catalytic reaction between a hydrogen gas and nitrogen oxides, said catalyzer being provided in an exhaust line;

a muffler located upstream and close to said catalyzer, said muffler being provided in said exhaust line; and a hydrogen generator for producing the hydrogen gas by the electrolysis of water or water vapor, thereby supplying said hydrogen gas into said exhaust gases at an upstream position of said catalyzer and in said muffler or a downstream position of said muffler;

whereby said nitrogen oxides are directly reduced with said hydrogen gas from said hydrogen generator under a low temperature atmosphere of not higher than 350° C.

3. An apparatus for reducing nitrogen oxides according to claim 2, further comprising oxidizing means for oxidizing HC, CO and other products of incomplete combustion, said oxidizing means being provided upstream of said catalyzer.

4. An apparatus for reducing nitrogen oxides according to claim 3, wherein oxygen gas emitted from said hydrogen generator is transferred into at least one of the atmosphere, an intake-manifold of said engine and said oxidizing means.

5. An apparatus for reducing nitrogen oxides according to claim 3, further comprising a soot trap upstream of said oxidizing means for removing diesel particulate.

6. An apparatus for reducing nitrogen oxides according to claim 3, wherein said oxidizing means is at least one of an oxidation catalyst, a three-way catalyst and an exhaust reactor.

7. An apparatus for reducing nitrogen oxides according to claim 2, wherein said hydrogen generator is applied to said water or water vapor by means of a water tank.

8. An apparatus for reducing nitrogen oxides according to claim 2, wherein said hydrogen generator is applied to said water or water vapor from at least one of ventilation gas from a crankcase of said engine and a part of said exhaust gas.

9. An apparatus for reducing nitrogen oxides according to claim 2, wherein said hydrogen generator uses a solid electrolyte having a proton or hydroxyl ion conducting capability for supplying said water or water vapor.

10. An apparatus for reducing nitrogen oxides according to claim 2, wherein said hydrogen generator uses an aqueous solution of one of alkali hydroxide and sulfuric acid and an ion conductive membrane for supplying said water or water vapor.

11. An apparatus for reducing nitrogen oxides according to claim 2, wherein oxygen gas emitted from said hydrogen generator is transferred in the atmosphere or an intake-manifold of said engine.

12. An apparatus for reducing nitrogen oxides according to claim 2, wherein an appropriate hydrogen level emitted from said hydrogen generator is controlled by a rate of NOx which is computed from outputs of a NOx sensor and an air intake sensor on said exhaust pipe.

13. An apparatus for reducing nitrogen oxides according to claim 2, wherein an appropriate hydrogen level emitted from said hydrogen generator is controlled by a predictive rate of NOx which is computed from outputs of sensors to be capable of detecting various conditions of operation in said internal combustion engine such as rotational speed, a negative pressure on said intake pipe, an opening of an intake control valve and an amount of a fuel injection as a fuel feeder.

14. An apparatus for reducing nitrogen oxides according to claim 2, wherein said hydrogen generator is provided with a mixer for mixing uniformly said hydrogen gas into said exhaust gas, in which said mixer consists of a flared diameter portion of said exhaust pipe and an injecting nozzle having a few orifices.

15. An apparatus for reducing nitrogen oxides according to claim 14, wherein said injecting nozzle consists of a small-diameter injecting nozzle and a large-diameter tube with a bottom having a plurality of injecting orifices in the side wall to be disposed downstream of said small-diameter injecting nozzle.

16. An apparatus for reducing nitrogen oxides according to claim 2, wherein said catalyzer uses either Pt/zeolite or Pt/alumina or Pt/silica catalyst.

17. An apparatus for reducing nitrogen oxides according to claim 2, further comprising a muffler for reducing noise of said combustion from said engine positioned near by an outlet for exhaust gas, wherein said exhaust muffler is unified with said catalyzer.

18. An apparatus for reducing nitrogen oxides from exhaust gases including nitrogen oxides and an oxygen gas from an internal combustion engine, said apparatus comprising:

a catalyzer for reducing said nitrogen oxides into a nitrogen gas and water vapor by a catalytic reaction between a hydrogen gas and nitrogen oxides, said catalyzer being provided in an exhaust line; and a hydrogen generator for producing the hydrogen gas by the electrolysis of water or water vapor, thereby supplying said hydrogen gas into said exhaust gases at an upstream position of said catalyzer;

wherein;

said nitrogen oxides are directly reduced with said hydrogen gas from said hydrogen generator under a low temperature atmosphere of not higher than 350° C.; and said hydrogen generator is provided with a mixer for mixing uniformly said hydrogen gas into said exhaust gas, in which said mixer consists of a flared diameter portion of said exhaust pipe and an injecting nozzle having a few orifices.

19. An apparatus for reducing nitrogen oxides according to claim 18, wherein said injecting nozzle consists of a small-diameter injecting nozzle and a large-diameter tube with a bottom having a plurality of injecting orifices in the side wall to be disposed downstream of said small-diameter injecting nozzle.

20. An apparatus for reducing nitrogen oxides from exhaust gases including nitrogen oxides and an oxygen gas from an internal combustion engine, said apparatus comprising:

a catalyzer for reducing said nitrogen oxides into a nitrogen gas and water vapor by a catalytic reaction between a hydrogen gas and nitrogen oxides, said catalyzer and being provided in an exhaust line;

a muffler located upstream and close to said catalyzer, said muffler being provided in said exhaust line; and a hydrogen generator for producing the hydrogen gas by the electrolysis of an aqueous methanol or a vapor of a mixture of methanol and water, thereby supplying said hydrogen gas into said exhaust gases at an upstream position of said catalyzer and in said muffler or a downstream position of said muffler; and whereby said nitrogen oxides are directly reduced with said hydrogen gas from said hydrogen generator under a low temperature atmosphere of not higher than 350° C.

* * * * *